（12）United States Patent
Westfal et al.

(10) Patent No.: US 10,131,001 B2
(45) Date of Patent: Nov. 20, 2018

(54) MILLING TOOL AND CUTTING ELEMENT FOR USE IN A MILLING TOOL

(71) Applicant: Ledermann GmbH & Co. KG, Horb (DE)

(72) Inventors: Ewald Westfal, Geislingen (DE); Benjamin Sitzler, Sulz am Neckar (DE); Steffen Hampel, Rottenburg (DE)

(73) Assignee: Ledermann GmbH & Co. KG, Horb (DE)

( * ) Notice: Subject to any disclaimer, the term of this patent is extended or adjusted under 35 U.S.C. 154(b) by 244 days.

(21) Appl. No.: 15/088,182

(22) Filed: Apr. 1, 2016

(65) Prior Publication Data

US 2016/0288221 A1    Oct. 6, 2016

(30) Foreign Application Priority Data

Apr. 1, 2015 (EP) ..................... 15000949

(51) Int. Cl.
*B23C 5/04* (2006.01)
*B23C 5/20* (2006.01)
(Continued)

(52) U.S. Cl.
CPC ................ *B23C 5/04* (2013.01); *B23C 5/207* (2013.01); *B23C 5/2221* (2013.01); *B27G 13/04* (2013.01);
(Continued)

(58) Field of Classification Search
CPC ...... B23C 2200/0416; B23C 2200/086; B23C 2200/128; B23C 2200/161; B23C 2200/361; B23C 2210/165; B23C 2210/168; B23C 2210/166; B23C 5/04; B23C 5/207; B23C 5/2221; B23C 5/2475; B23B 27/16; B23B 2205/16
(Continued)

(56) References Cited

U.S. PATENT DOCUMENTS 1,629,667 A  *  5/1927  Knipple .................. B23B 27/06
                                                   407/103
4,209,047 A  *  6/1980  Weill .................... B23B 27/164
                                                   144/208.8
(Continued)

FOREIGN PATENT DOCUMENTS

DE    20 2014 104 712 U1    12/2014
EP        1 647 346 A1        4/2006
(Continued)

*Primary Examiner* — Sunil K Singh
*Assistant Examiner* — Nicole N Ramos
(74) *Attorney, Agent, or Firm* — Gudrun E. Huckett (57) ABSTRACT

A milling tool has a support member with an exterior surface with at least one receptacle, wherein the at least one receptacle has a bottom. At least one cutting element provided with a cutter having a cutting edge is positioned in the at least one receptacle. A three-point support is arranged between the at least one cutting element and the bottom of the at least one receptacle for positioning the cutting edge relative to the bottom of the at least one receptacle. The three-point support comprises three support pads arranged at a bottom side of the at least one cutting element and/or three projections arranged at the bottom of the at least one receptacle.

8 Claims, 4 Drawing Sheets

(51) Int. Cl.
*B23C 5/22* (2006.01)
*B27G 13/04* (2006.01)

(52) U.S. Cl.
CPC .............. *B23C 2200/0416* (2013.01); *B23C 2200/086* (2013.01); *B23C 2200/128* (2013.01); *B23C 2200/161* (2013.01); *B23C 2200/361* (2013.01); *B23C 2210/165* (2013.01); *B23C 2210/168* (2013.01)

(58) Field of Classification Search
USPC .......... 407/104, 103, 101, 73, 48, 46, 40, 34
See application file for complete search history.

(56) References Cited

U.S. PATENT DOCUMENTS

| | | | | |
|---|---|---|---|---|
| 5,529,439 | A * | 6/1996 | Werner | B23C 5/241 407/39 |
| 5,658,101 | A * | 8/1997 | Hammer | B02C 18/186 407/33 |
| 5,836,724 | A * | 11/1998 | Satran | B23B 27/1662 407/103 |
| 6,929,429 | B2 * | 8/2005 | Riviere | B23C 5/08 407/113 |
| 2005/0169723 | A1 * | 8/2005 | Schafer | B23B 27/007 409/234 |
| 2007/0248425 | A1 * | 10/2007 | Andersson | B23C 5/06 407/113 |
| 2008/0166191 | A1 * | 7/2008 | Andersson | B23C 5/2208 407/103 |
| 2008/0181731 | A1 * | 7/2008 | Wallstrom | B23C 5/2213 407/116 |
| 2009/0290945 | A1 | 11/2009 | Carl | |
| 2011/0103905 | A1 * | 5/2011 | Morrison | B23C 5/2213 407/48 |
| 2011/0305533 | A1 | 12/2011 | Kisselbach et al. | |
| 2012/0121345 | A1 | 5/2012 | Neiman et al. | |
| 2012/0201622 | A1 * | 8/2012 | Kocherovsky | B23B 29/02 409/131 |
| 2012/0230784 | A1 * | 9/2012 | Hoefler | B23C 5/109 407/40 |
| 2013/0195567 | A1 * | 8/2013 | Sunnvius | B23C 5/06 407/40 |
| 2013/0251464 | A1 * | 9/2013 | Hecht | B23C 5/06 407/48 |
| 2014/0334890 | A1 * | 11/2014 | Takahashi | B23C 5/109 407/114 |

FOREIGN PATENT DOCUMENTS

| | | |
|---|---|---|
| EP | 1 702 703 A1 | 9/2006 |
| EP | 1 899 098 B1 | 3/2008 |
| WO | 2009/019676 A1 | 2/2009 |

* cited by examiner

MILLING TOOL AND CUTTING ELEMENT FOR USE IN A MILLING TOOL

BACKGROUND OF THE INVENTION

The invention relates to a milling tool comprising a support member and at least one cutting element, wherein the cutting element comprises a cutter with a cutting edge, wherein the support member has a receptacle at its exterior surface for receiving the cutting element and wherein the receptacle has a bottom. The invention further relates to a cutting element for use in such a milling tool.

DE 20 2014 104 712 U1 discloses a milling tool with a substantially cylindrical outer contour provided at its circumferential exterior surface with a plurality of receptacles for receiving cutting elements. The cutting elements mounted in the receptacles are resting flat against the bottom of the receptacles and are secured by means of a screw in the receptacles.

US 2011/0305533 A1 discloses a comparable milling tool in which a portion of the receptacle is utilized as a recess for guiding away cuttings.

For producing a uniform surface of a workpiece machined with such milling tools, the projecting portions of the cutting edges of the individual cutters extending past the circumferential surface of the support member must be adjusted precisely relative to each other. For this purpose, the cutters which are initially projecting with excess length past the circumferential surface must be ground after mounting in a specially designed machine in order to have a common finished dimension. In this way, initial excess length differences of the various cutting edges are equalized. After exchange of one or several cutting elements, for example, because these cutting elements are worn, the described equalization process for different excess lengths must be performed again.

Another difficulty is that dirt particles become lodged in operation at the bottom of the receptacles and at the bottom side of the cutting elements. Such dirt particles, in particular resin residues when machining wood, must be removed before a new cutting element can be inserted into a receptacle. When performing such a cleaning action, care must be taken not to damage the receptacles and not to introduce unevenness into the receptacles.

SUMMARY OF THE INVENTION

It is the object of the invention to further develop a milling tool of the aforementioned kind in such a way that a uniform projecting length of the cutting edges past the exterior surface of the milling tool can be achieved in a simple way.

In accordance with the present invention, this is achieved in that, for positioning the cutting edge relative to the bottom of the receptacle, a three-point support between cutting element and support member is arranged.

It is a further object of the present invention to provide a cutting element that is suitable for insertion in such a milling tool and that can be arranged in a simple way precisely positioned within the milling tool.

In accordance with the present invention, this is achieved in that the cutting element at its bottom side is provided with three support pads for forming the three-point support.

In a milling tool according to the invention, a three-point support is arranged between cutting element and support member for positioning the cutting edge relative to the bottom of the receptacle. In this way, the orientation of the cutting edge of the cutter relative to the bottom of the receptacle can be unequivocally determined without being overdetermined. In particular, the greatest distance of the cutting edge to the bottom of the receptacle is unequivocally determined by the three-point support. As a result of this, also the projecting length of the cutting edge past the exterior surface of the support member is unequivocally determined. With this precise determination of the distance of the cutting edge to the bottom of the receptacle and of the projecting length of the cutting edge projecting past the exterior surface of the support member, it is also possible to arrange several cutting elements in the support member whose cutting edges project by the same amount past the exterior surface of the support member. An equalization step for the cutting edges after introduction of the cutting elements into the receptacles of the support member is not required.

In an advantageous embodiment of the invention, it is provided that the three-point support comprises three support pads arranged on the bottom side of the cutting element. In this way, cleaning of the cutting elements prior to introduction into the receptacles of the support member is facilitated. It is only necessary to roughly remove dirt from the area between the support pads; care must be taken only that the support pads of the cutting element are clean at their contact points. When the bottom of the receptacle into which the cutting element is to be inserted is clean at the locations where the support pads of the cutting element are to be brought into contact, a reproducible precise positioning of the cutting element and its corresponding cutting edge in the support member of the milling tool is possible in a quick and easy way.

In a further advantageous embodiment of the invention, it is provided that the three-point support comprises three projections arranged on the bottom of the receptacle of the support member. In this way, cleaning of the receptacle of the support member prior to the introduction of the cutting element into the receptacle is facilitated. The bottom of the receptacle must be cleaned only roughly in the area between the projections and must be cleaned thoroughly only in the area of the three projections on which the cutting element is resting in the mounted state. With an appropriate cleaning of the bottom side of the cutting element, a precise positioning of the cutting element and of its associated cutting edge in the receptacle of the support member is possible in a quick and easy way.

Advantageously, the three-point support comprises three support pads at the bottom side of the cutting element as well as three projections on the bottom of the receptacle of the support member.

The sidewalls of the receptacle can be positioned at an angle that is equal to 90° relative to the bottom of the receptacle.

In an advantageous further embodiment of the invention, it is however provided: that at least one sidewall of the receptacle is extending at an angle of less than 90° relative the bottom of the receptacle so that a wedge-shaped space is formed; that the cutting element has a wedge-shaped tip or edge whose shape matches the shape of the wedge-shaped space of the receptacle; that the cutting element comprises a wedge-shaped pressure surface that is positioned opposite the wedge-shaped tip or edge; that the milling tool has a fastening element for fastening the at least one cutting element; and that the fastening element engages the wedge-shaped pressure surface of the cutting element and forces the cutting element into the wedge-shaped space of the receptacle. In this way, a quick and easy attachment of the cutting element in the receptacle of the support member of the milling tool is possible.

In this context, the cutting element is secured on one side by the fastening element. On the opposite side, comprising in a cross-sectional view a wedge-shaped tip or edge, the fixation is realized by interaction of the wedge-shaped tip or edge of the cutting element with the wedge-shaped space of the receptacle. Due to the wedge-shaped pressure surface that is engaged by the fastening element, the cutting element is forced against the bottom of the receptacle as well as forced in a plane parallel to the plane of the bottom of the receptacle in a direction toward the wedge-shaped space of the receptacle. Due to the aforementioned angle of less than 90°, this also causes a pressing action of the cutting element against the bottom of the receptacle. Advantageously, the three points of the three-point support are arranged in the area of the fastening element and in the are of the wedge-shaped space of the receptacle of the support member. With such an arrangement, the cutting element can be pressed accordingly with a single fastening element against the bottom of the receptacle in the area of each one of the three points of the three-point support.

In an advantageous embodiment of the invention, it is provided that the fastening element is a countersunk head screw and that the wedge-shaped pressure surface of the cutting element has a depression that is matched to the shape of the head of the countersunk head screw and opens at the lateral face of the cutting element and has the shape of a cone section. In this way, the wedge-shaped pressure surface and the associated fastening element are realized in a simple way.

In an advantageous further embodiment of the invention, it is provided that a point of the three-point support is arranged in the area of the fastening element. In this way, the cutting element is contacting directly the bottom of the receptacle in the area of the fastening element in which the greatest contact pressure of the cutting element relative to the bottom of the receptacle is existing. In this way, it is prevented that the cutting element will bend in the area of the fastening element under the pressure of the fastening element.

In an advantageous further embodiment of the cutting element according to the invention, it is provided that the cutting element has a cutout with an opening at the lateral face of the cutting element for receiving the fastening element and that the cutout adjoins a support pad of the cutting element. Since the cutout for receiving the fastening element is open at the lateral face of the cutting element, it is possible in a simple way to exert by means of the fastening element pressure on the cutting element in a defined direction. Accordingly, the cutting element can be pressed in a simple way by means of the fastening element into the wedge-shaped space of the receptacle of the support member of the milling tool according to the invention. Since the cutout immediately adjoins a support pad of the cutting element and since the cutout serves for receiving the fastening element, the cutting element in the area of the fastening element, where the greatest contact pressure is exerted on the cutting element by the fastening element, is directly contacting the bottom of the receptacle of the support member of the milling tool according to the invention. Accordingly, bending (sagging) of the cutting element in the area of the fastening element is prevented.

In an advantageous further embodiment of the cutting element according to the invention, it is provided that in the cutting element a recessed cuttings guide for guiding away cuttings (chips) is formed and provided with an opening that in the mounted state of the cutting element opens at the exterior surface of the support member. The recessed cuttings guide provides a space for guiding away cuttings (chips) and this space is exclusively arranged within the cutting element. Accordingly, when machining a workpiece, the resulting cuttings (chips) are exclusively guided through the cutting element. In this way, wear of the support member of the milling tool as a result of the action of guiding away cuttings (chips) is avoided. The support member therefore can be produced of lighter and softer material. Wear on the cutting element by the guiding action for the cuttings (chips) is more beneficial than wear on the support member by such a guiding action for the cuttings (chips) because the cutting element can be exchanged. Moreover, the cutting element can be produced of stronger material that is less prone to wear. Since the recessed cuttings guide for moving away cuttings (chips) is provided exclusively within the cutting element, the intermediate spaces between the cutting element and the support member become less soiled. The cuttings of the workpiece being machined are directly guided away from the milling tool by means of the cutting element and, ideally, to not even contact the support member of the milling tool at all.

BRIEF DESCRIPTION OF THE DRAWING

Embodiments of the invention will be explained in more detail with the aid of the attached drawings.

DESCRIPTION OF PREFERRED EMBODIMENTS

Figure 1:
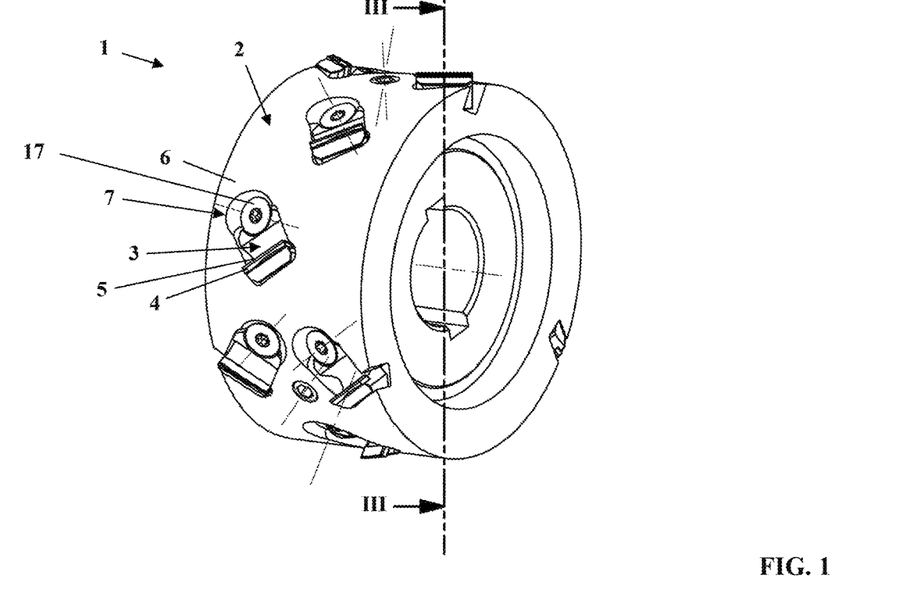
FIG. 1 shows in a perspective illustration a milling tool according to the invention with inserted cutting elements.

FIG. 1 shows in a perspective illustration a milling tool 1 comprising a support member 2 and several cutting elements 3. The support member 2 comprises a substantially cylindrical outer contour. Receptacles 7 are arranged in the circumferential exterior surface of the support member 2. The receptacles 7 are realized by recesses formed in the exterior surface 6 of the support member 2. The exterior surface 6 corresponds to the circumferential wall surface of the support member 2. Cutting elements 3 are inserted in the receptacles 7 of the support member 2. The cutting elements 3 comprise a cutter 4 with a cutting edge 5. The cutter 4 is connected fixedly so as to be immobile to a base body of the cutting element 3. The cutting elements 3 are secured by means of countersunk head screws 17 in the receptacles 7 of the support member 2. As a result of the cylindrical outer contour of the support member 2, the cutting edges 5 of the cutters 4 are arranged on a straight (linear) envelope curve that is extending axis-parallel to the axis of rotation of the milling tool 1. Accordingly, a cylindrical milling contour is produced. Of course, deviating contours of the support member 2, for example, with a conical shape and an envelope curve that is not axis-parallel as well as with convex, concave or combined envelope curves of the cutting edges 5, are possible also within the scope of the invention.

Figure 2:
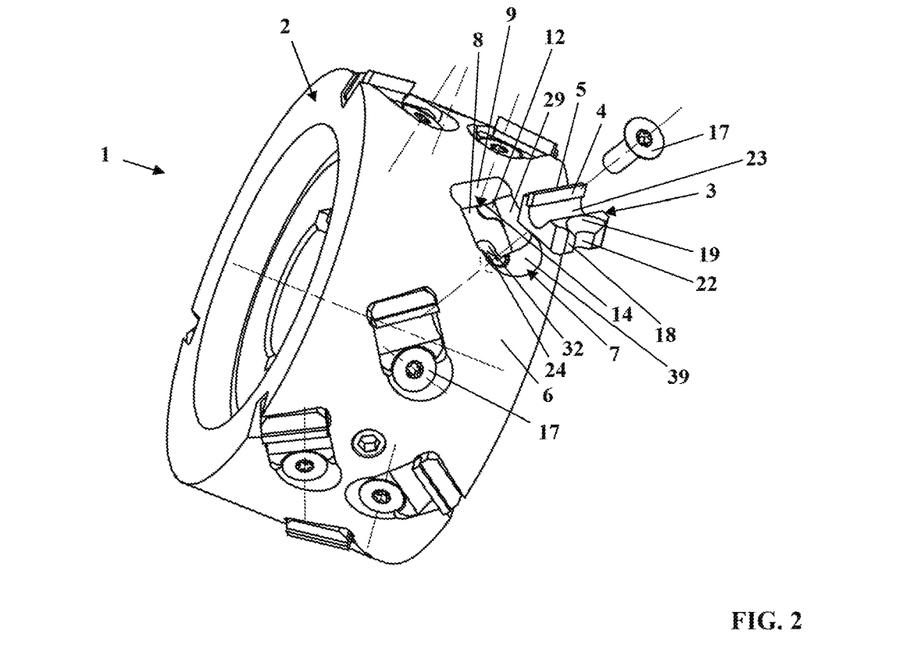
FIG. 2 shows the milling tool according to FIG. 1 in an exploded view of the fastening area of an individual cutting element for illustrating various details.

FIG. 2 shows in a perspective illustration the milling tool 1 according to FIG. 1 wherein a cutting element 3 and the associated countersunk head screw 17 are illustrated in an exploded illustration removed from their receptacle 7. The receptacle 7 comprises sidewalls 9, 29, 39 and a bottom 8. In the area of the sidewall 39, a threaded bore 24 for receiving the countersunk head screw 17 is provided in the bottom 8 of the receptacle 7. The sidewall 9 is arranged opposite the sidewall 39. The sidewall 39 and the sidewall 9 are connected by means of the sidewall 29 and a further sidewall, extending parallel to the sidewall 29 and not illustrated in FIG. 2.

Figure 6:
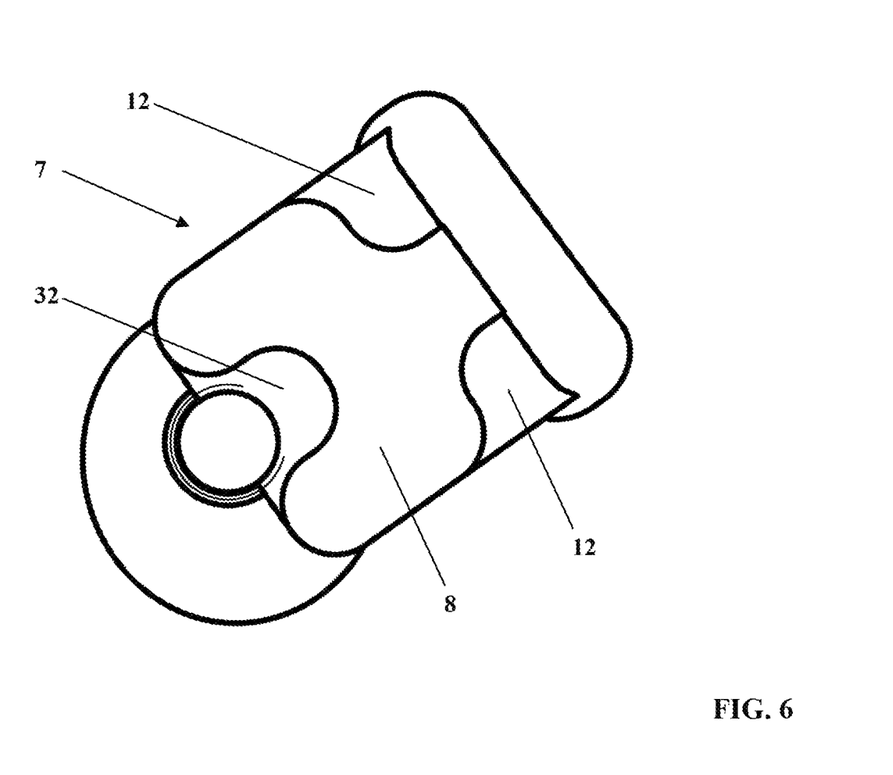
FIG. 6 is top plan view of one of the receptacles shown in FIG. 2 with three projections at the bottom.

At the bottom 8 of the receptacle 7, three projections are arranged which in the embodiment according to FIGS. 1 to 4 provide a three-point support for the cutting element 3. In FIG. 2, two projections 12, 32 of these three projections are visible. FIG. 6 is a top plan view of the receptacle 7 showing all three projections 12, 32. The projection 32 is provided in the area of the threaded bore 24. The projection 12 is arranged in the area of the bottom 8 where the sidewall 9 and the sidewall 29 meet each other. The third projection 12, not illustrated in FIG. 2 but shown in the top view of FIG. 6, is arranged in the area of the bottom 8 where the sidewall 9 and the sidewall opposite the sidewall 29 are meeting each other. In this way, two projections 12 arranged in the area of the sidewall 9 are provided and projection 32 is provided in the area of the threaded bore 24 and the opposite sidewall 39. The projections 12, 32 are not arranged on a common straight line but define a triangle, in this embodiment an isosceles triangle.

For attachment of a cutting element 3 in the receptacle 7, the countersunk head screw 17 is screwed into the threaded bore 24 and, in this way, the cutting element 3 to be attached is secured by means of the countersunk head screw 17. In the fastened state of the cutting element 3, one point of the three-point support is thus arranged in immediate vicinity of the countersunk head screw 17 and thus in the area of the fastening element.

In the fastened state of the cutting element 3, the bottom side of the cutting element 3 is resting on the three-point support that is formed by the three projections. The three-point support is arranged between the cutting element 3 and the support member 2 and serves for positioning the cutting edge 5 of the cutter 4 of the cutting element 3 relative to the bottom 8 of the receptacle 7.

Figure 3:
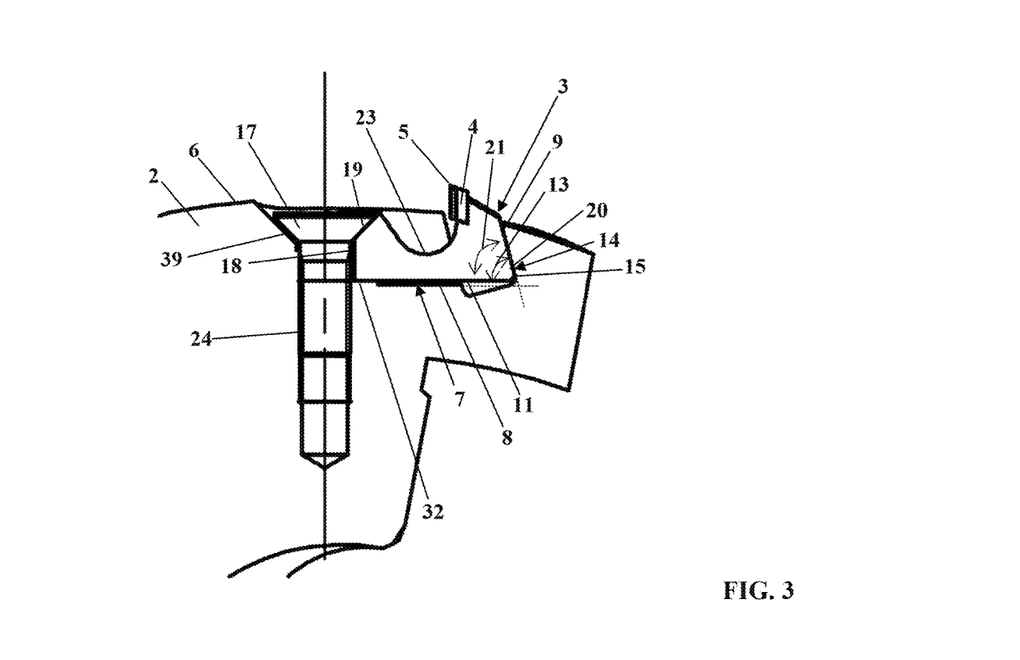
FIG. 3 shows in a detail illustration according to the section plane III-III indicated in FIG. 1 a first embodiment of a cutting element that is fastened by means of a fastening element in a receptacle.

FIG. 3 shows a detail illustration of a section along the section line III-III that is shown in FIG. 1. The cutting element 3 is positioned in the receptacle 7 and is fastened by means of the countersunk head screw 17 in the receptacle 7. The receptacle 7 is realized by a recess in the exterior surface 6 of the support member 2. A threaded bore 24 for receiving a countersunk head screw 17 is provided in the bottom 8 of the receptacle 7 at the border of the receptacle 7 in the area of the sidewall 39. The sidewall 9 opposite the sidewall 39 of the receptacle 7 is extending at an angle 13 relative to the bottom 8 of the receptacle 7. The angle 13 is smaller than 90°. Advantageously, the angle 13 is smaller than 80°. By positioning the sidewall 9 of the receptacle 7 relative to the bottom 8 of the receptacle 7 at an angle 13 of less than 90°, a wedge-shaped space 14 is formed in the receptacle 7 between the sidewall 9 and the bottom 8. The wedge-shaped space 14 in the receptacle 7 is positioned opposite the sidewall 39 and the countersunk head screw 17.

The cutting element 3 introduced into the receptacle 7 comprises a wedge-shaped edge or tip 15 in the illustrated cross-section view whose shape matches the shape of the wedge-shaped space 14 of the receptacle 7. The cutting element 3 comprises a bottom side 11 and a sidewall 20. The wedge-shaped edge or tip 15 of the cutting element 3 is formed by the sidewall 20 and the bottom side 11. The sidewall 20 and the bottom side 11 of the cutting element 3 define an angle 21. The angle 21 is smaller than 90° and is equal to the angle 13 at which the bottom 8 of the receptacle 7 is positioned relative to the sidewall 9 of the receptacle 7. It may also be provided that the angle 21 of the wedge-shaped edge or tip 15 of the cutting element 3 is greater than the angle 13 of the wedge-shaped space 14 of the receptacle 7.

Figure 4:
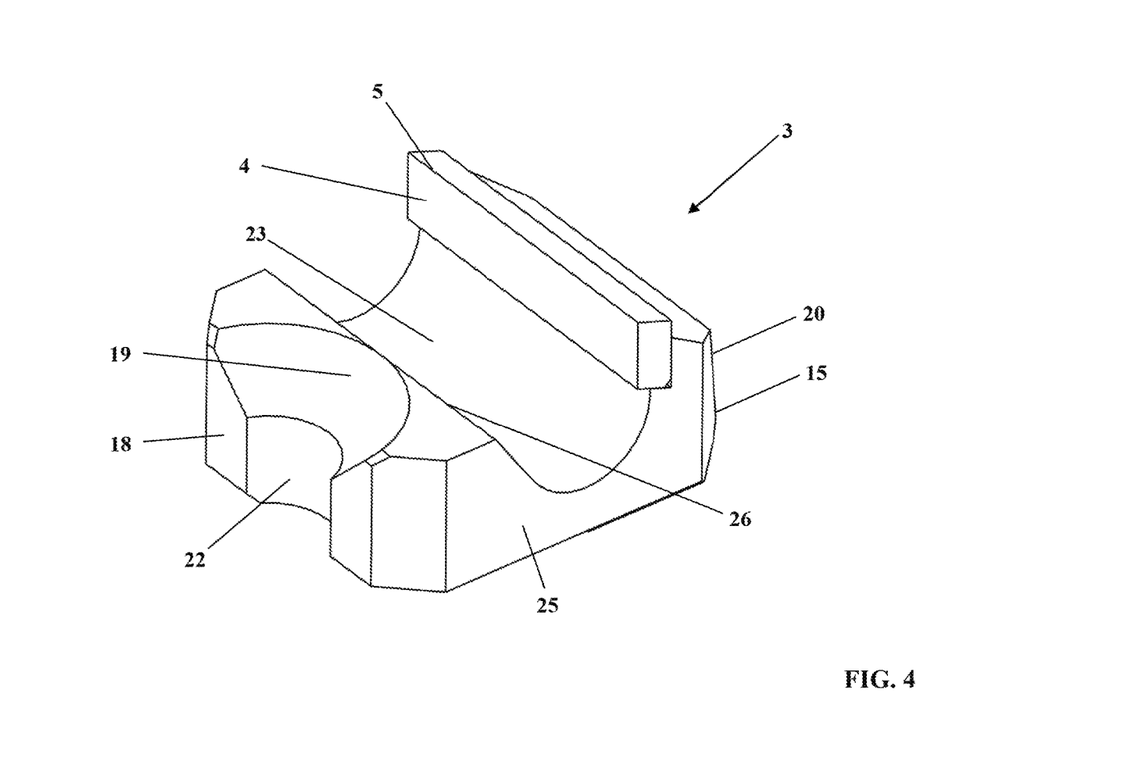
FIG. 4 is a perspective illustration of the cutting element employed in the milling tool according to FIGS. 1 to 3.

The cutting element 3 comprises a wedge-shaped pressure surface which is positioned opposite the wedge-shaped edge or tip 15 and is provided with oppositely oriented slope. In the embodiment according to FIGS. 1 to 4, the wedge-shaped pressure surface of the cutting element 3 is realized by a depression 19 in the form of a cone section which is matched to the shape of the head of the countersunk head screw 17 and which opens at the lateral face 18 of the cutting element 3. The lateral face 18 of the cutting element 3 is opposite the wedge-shaped edge 15 of the cutting element 3. As can be seen in FIG. 4, a cutout 22 is provided in the lateral face 18 of the cutting element 3. The cutout 22 has the shape of an inner surface of a cylinder section and is matched to the shape of the countersunk head screw 17.

FIG. 3 shows that the cutting element 3 is clamped between the fastening element in the form of the countersunk head screw 17 and the sidewall 9 of the receptacle 7. The countersunk head screw 17 engages the wedge-shaped pressure surface of the cutting element 3 designed as an open depression 19 and forces the cutting element 3 into the wedge-shaped space 14 of the receptacle 7 of the support member 2. Since the angle 13 between the sidewall 9 and the bottom 8 of the receptacle 7 is smaller than 90°, the cutting element 3 is thus also forced by means of the sidewall 9 toward the bottom 8 of the receptacle 7 in the area of the wedge-shaped space 14 of the receptacle 7. The cutting element 3 is then contacting the three projections arranged on the bottom 8 of the receptacle 7. Due to the interaction of the wedge-shaped edge 15 of the cutting element 3 with the wedge-shaped space 14 of the receptacle 7, the countersunk head screw 17 forces the cutting element 3 against the projection 32 provided in the area of the countersunk head screw 17 and also forces the cutting element 3 against the projection 12 illustrated in FIG. 2 and the projection between the sidewall 9 and the sidewall, not illustrated in FIG. 2, that is opposite the sidewall 27. In this way, the cutting element 3 is forced by means of a single countersunk head screw 17 against all three points of the three-point support.

Accordingly, the position of the cutting element 3 in all spatial degrees of freedom is secured precisely relative to the support member 2. This applies in particular also to the distance of the cutting edge 5 of the cutter 4 of the cutting element 3 relative to the bottom 8 of the receptacle 7 which in this way is determined in a defined way. Even when the cutting element 3 is replaced by a constructively identical cutting element, the spacing between the cutting edge of this replacement cutting element relative to the bottom 8 of the receptacle 7 is the same as before for the cutting element 3 that has been replaced. For this purpose, it is only necessary that at the projections on the bottom 8 of the receptacle 7 no residues are present. The three-point support enables for same manufacturing tolerances a much more precise and much more reproducible positioning of the cutting element 3 and of the associated cutting edge 5 relative to the bottom 8 of the receptacle 7 of the support member 2 compared to positioning of a cutting element that is resting flat on the bottom of a receptacle.

FIG. 4 shows in a perspective illustration a cutting element 3 of FIGS. 1 to 3. Opposite to the bottom side, not illustrated, of the cutting element 3, a recessed cuttings guide 23 is arranged. The recessed cuttings guide 23 is formed by a substantially part-cylindrical recess in the base body of the cutting element 3. The longitudinal direction of the cylinder-shaped hollow space extends parallel to the sidewall 20 of the cutting element 3 and parallel to the lateral face 18 of the cutting element 3 and thus parallel to the cutting edge 5. The lateral face 18 and the sidewall 20 are connected to each other by a sidewall 25 and a sidewall, not illustrated, positioned opposite the sidewall 25. The recessed cuttings guide 23 opens at the sidewall 25 and at the sidewall positioned opposite thereto (not illustrated).

In the mounted state of the cutting element 3, the recessed cuttings guide 23 is open in the direction of the exterior surface 6 of the support member 2 shown in FIG. 3. On the first rim of the opening of the recessed cuttings guide 23 which is opposite the lateral face 18 of the cutting element 3, a cutter 4 with a cutting edge 5 is arranged. The cutting edge 5 projects past the first rim of the opening of the recessed cuttings guide 23. The recessed cuttings guide 23 comprises a second rim which is closer to the lateral face 18 of the cutting element 3 that the first rim and on which an edge 26 is formed. Cuttings (chips) which are removed from a workpiece by the cutting edge 5 of the cutter 4 are guided initially into the cylindrical hollow space of the recessed cutting guide 23 and then across the edge 26 of the recessed cuttings guide 23 away from the cutting element 3 and away from the milling tool 1.

The cuttings guiding space is formed exclusively by the recessed cuttings guide 23 of the cutting element 3. In this way it is substantially prevented that cuttings can lodge in the intermediate spaces between the cutting element and the receptacle of the support member as would be the case when a cuttings guiding space is comprised of parts of the cutting element as well as of parts of the receptacle. This configuration according to the invention facilitates cleaning of the individual parts of the milling tool 1 prior to insertion of the cutting element 3 into a receptacle 7 of the support member 2.

Figure 5:
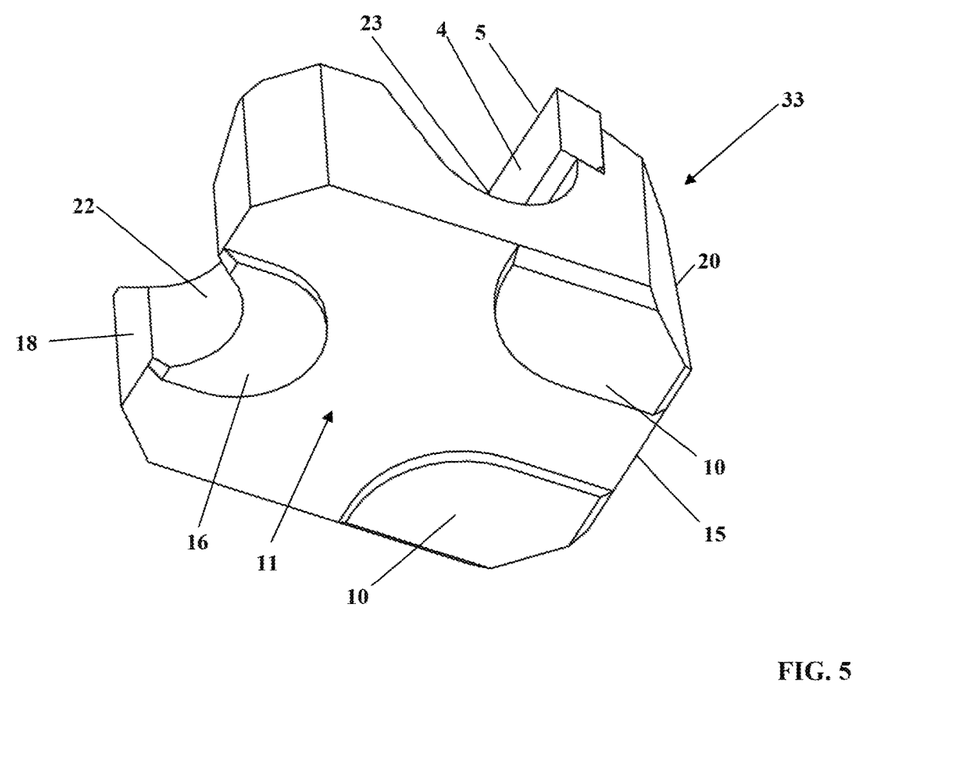
FIG. 5 is a perspective illustration of an alternative embodiment of a cutting element with support pads at its bottom side for use in a milling tool according to the invention.

FIG. 5 shows in a perspective illustration an alternative embodiment of the cutting element 3 according to the embodiment of FIGS. 1 to 4. The cutting element 33 illustrated in FIG. 5 differs from the cutting element 3 according to FIGS. 1 to 4 in that at the bottom side 11 of the cutting element 33 three support pads are secured. Corresponding parts are identified in all Figures with the same reference characters.

The cutting element 33 comprises a cutout 22 opening at the lateral face 18 of the cutting element 33 for receiving a fastening element. The cutout 22 adjoins a support pad 16 of the cutting element 33. The support pad 16 is provided at the bottom side 11 of the cutting element 33 in the area of the cutout 22. In the mounted state of the cutting element 33 in the receptacle 7 of the support member 2 of the milling tool 1 according to FIGS. 1 to 3, the support pad 16 of the cutting element 33 partially engages about the countersunk head screw 17 used as a fastening element.

Two additional support pads 10 are arranged on the side of the bottom side 11 which is opposite the support pad 16. The two support pads 10 are arranged in the area of the wedge-shaped edge 15 of the cutting element 33. As in case of the cutting element 3 according to FIGS. 1 to 4, the wedge-shaped edge 15 is opposite the lateral face 18 of the cutting element 33. The three support pads 10, 16 at the bottom side 11 of the cutting element 33 serve for forming the three-point support.

The three-point support can be formed exclusively by the three support pads 10, 16 but also by the three support pads 10, 16 and the projections 12, 32 provided on the bottom 8 of the receptacle 7 of the support member 2 of the milling tool 1, as illustrated in FIG. 2. In any case, the respective positions of the support pads 10, 16 correspond to the respective positions of the projections 12, 32.

The cutting element 3 illustrated in FIGS. 1 to 4 can also be formed like the cutting element 33 according to FIG. 5 with support pads 10, 16. The formation of a three-point support by support pads 10, 16 on a cutting element 33 and by projections 12, 32 in the receptacle 7 has the advantage that cleaning of the cutting element 33 and of the receptacle 7 prior to insertion of the cutting element 33 into the receptacle 7 must be carried out only at three points, respectively. It is sufficient to clean the three support pads 10, 16 of the cutting element 33 and the three projections 12, 32 of the receptacle 7. This provides already a reproducible positioning of the cutting element 33 in the receptacle 7. Also, it is possible to immediately position a cutting element that is constructively identical to the cutting element 33 in the receptacle 7 in the same way as the previous cutting element 33.

It is however also possible to use the cutting element 33 according to FIG. 5 in a milling tool with a support member with receptacles without projections. Such a support member can be designed identically to the support member 2 of FIG. 2 with the exception that at the bottom 8 of the receptacle 7 there are no projections 12, 32 and the bottom 8 is planar. The three-point support is then provided exclusively by the three support pads 10, 16 of the cutting element 33.

The specification incorporates by reference the entire disclosure of European priority document 15 000 949.6 having a filing date of Apr. 1, 2015.

While specific embodiments of the invention have been shown and described in detail to illustrate the inventive principles, it will be understood that the invention may be embodied otherwise without departing from such principles.

What is claimed is:
1. A milling tool comprising:
a support member comprising an exterior surface with at least one receptacle, wherein the at least one receptacle comprises a bottom;
at least one cutting element comprising a cutter with a cutting edge, wherein the at least one cutting element is positioned in the at least one receptacle;
a three-point support arranged between the at least one cutting element and the bottom of the at least one receptacle for positioning the cutting edge relative to the bottom of the at least one receptacle;
a fastening element configured to fasten the at least one cutting element in the at least one receptacle;
wherein the at least one receptacle comprises at least one sidewall oriented at an angle of less than 90° relative to the bottom of the at least one receptacle so that a wedge-shaped space is defined between the at least one sidewall and the bottom;

wherein the at least one cutting element comprises a wedge-shaped edge having a shape matching the shape of the wedge-shaped space;

wherein the at least one cutting element comprises a wedge-shaped pressure surface positioned opposite the wedge-shaped edge;

wherein the fastening element engages the wedge-shaped pressure surface of the at least one cutting element and the at least one cutting element is forced by the fastening element into the wedge-shaped space of the at least one receptacle;

wherein the at least one cutting element is forced by the at least one sidewall toward the bottom of the at least one receptacle.

2. The milling tool according to claim 1, wherein the three-point support comprises three support pads arranged at a bottom side of the at least one cutting element.

3. The milling tool according to claim 1, wherein the three-point support comprises three projections arranged at the bottom of the at least one receptacle.

4. A milling tool comprising:
a support member comprising an exterior surface with at least one receptacle, wherein the at least one receptacle comprises a bottom;
at least one cutting element comprising a cutter with a cutting edge, wherein the at least one cutting element is positioned in the at least one receptacle;
a three-point support arranged between the at least one cutting element and the bottom of the at least one receptacle for positioning the cutting edge relative to the bottom of the at least one receptacle;
a fastening element configured to fasten the at least one cutting element in the at least one receptacle;
wherein the at least one receptacle comprises at least one sidewall oriented at an angle of less than 90° relative to the bottom of the at least one receptacle so that a wedge-shaped space is defined between the at least one sidewall and the bottom;
wherein the at least one cutting element comprises a wedge-shaped edge having a shape matching the shape of the wedge-shaped space;
wherein the at least one cutting element comprises a wedge-shaped pressure surface positioned opposite the wedge-shaped edge;
wherein the fastening element engages the wedge-shaped pressure surface of the at least one cutting element and the at least one cutting element is forced by the fastening element into the wedge-shaped space of the at least one receptacle;
wherein the fastening element is a countersunk head screw and wherein the wedge-shaped pressure surface of the at least one cutting element comprises a depression that is in the form of a cone section matched to the shape of the head of the countersunk head screw and that opens at a lateral face of the at least one cutting element.

5. The milling tool according to claim 1, wherein one point of the three-point support is arranged in an area where the at least one cutting element is engaged by the fastening element.

6. A cutting element for use in a milling tool, the milling tool comprising a support member comprising an exterior surface with at least one receptacle, wherein the at least one receptacle comprises a bottom and is configured to receive the cutting element; the cutting element comprising:
a cutter with a cutting edge;
a bottom side;
three support pads arranged on the bottom side, wherein the three support pads form a three-point support;
sidewalls, wherein at least one of the sidewalls is positioned at an angle of less than 90° relative to the bottom side and forms together with the bottom side a wedge-shaped edge, when viewed in a cross-sectional view;
a wedge-shaped pressure surface arranged opposite the wedge-shaped edge.

7. The cutting element according to claim 6, further comprising a cutout that opens at a lateral face of the cutting element and is configured to receive a fastening element and wherein the cutout adjoins one of the support pads of the cutting element.

8. The cutting element according to claim 6, further comprising a recessed cuttings guide having an opening that, in a mounted state of the cutting element in the milling tool, is open in a direction toward the exterior surface of the support member of the milling tool.

* * * * *